United States Patent [19]

Ida

[11] Patent Number: 5,056,501
[45] Date of Patent: Oct. 15, 1991

[54] COMBUSTION HEATER

[75] Inventor: Hiroyuki Ida, Konan, Japan

[73] Assignee: Zexel Corporation, Tokyo, Japan

[21] Appl. No.: 610,352

[22] Filed: Nov. 7, 1990

[30] Foreign Application Priority Data

Nov. 16, 1989 [JP] Japan ............................ 1-133474[U]

[51] Int. Cl.⁵ ............................................ F24H 3/02
[52] U.S. Cl. ............................ 126/110 B; 126/110 R; 431/262; 431/300
[58] Field of Search ............... 431/261, 262, 300, 328; 126/110 B, 110 R, 99 A

[56] References Cited

U.S. PATENT DOCUMENTS

| | | |
|---|---|---|
| 1,793,326 | 2/1931 | Knupffer . |
| 2,685,335 | 4/1954 | McCutchen . |
| 2,779,398 | 1/1957 | Brown . |
| 2,966,945 | 1/1961 | Downs ............... 431/261 |
| 3,176,749 | 4/1965 | Downs . |
| 3,523,004 | 8/1970 | Mellett . |
| 4,538,985 | 9/1985 | Zwicker ............... 431/261 |
| 4,703,888 | 11/1987 | Kawamura et al. . |
| 4,789,331 | 12/1988 | Kawamura ............... 431/262 |
| 4,818,219 | 4/1989 | Widemann et al. ......... 431/261 |

FOREIGN PATENT DOCUMENTS 0287923 4/1988 European Pat. Off. .
767865 1/1934 France .
60-164108 8/1985 Japan .

Primary Examiner—Carroll B. Dority
Attorney, Agent, or Firm—Frishauf, Holtz, Goodman & Woodward

[57] ABSTRACT

A combustion heater includes a burner cylinder defining therein a combustion chamber. The burner cylinder has a peripheral wall thereof having a number of air inlet holes formed therein, one bottomed end thereof having an end wall formed with at least one opening, and another open end thereof having a peripheral edge. A wick is exposed to the combustion chamber for impregnating with liquid fuel. The peripheral edge of the open end of the burner cylinder is disposed in close contact with the wick. The end wall of the bottomed end of same is opposed to the wick. The burner cylinder has a radially extending reflecting portion formed by the end wall of the bottomed end thereof.

6 Claims, 3 Drawing Sheets

COMBUSTION HEATER

BACKGROUND OF THE INVENTION

This invention relates to a combustion heater for use in vehicles with a hot storage for preserving foods, etc. in a hot state, or the like, and more particularly to a combustion heater of this kind which is adapted to vaporize liquid fuel supplied to the wick, and ignite and burn a mixture of combustion air and vaporized liquid fuel within a combustion chamber.

Conventionally, a combustion heater of this kind has been proposed e.g. by U.S. Ser. No. 07/479,087 assigned to the same assignee as the present application, now abandoned. The proposed combustion heater comprises, as shown in FIG. 1, a burner cylinder 104 having a peripheral wall thereof formed with a number of air inlet holes 104b to define a combustion chamber 104a therein, a wick 106 for impregnating with liquid fuel, a wick holder 107 holding the wick 106 exposed to the combustion chamber 104a, a shaft 122 secured at one end thereof to the wick holder 107 in a manner projecting into the combustion chamber 104a, and a flange member 121 radially extending from the other end of the shaft 122 in a manner facing the wick 106.

According to the proposed combustion heater, the flange member 121 functions as follows: When combustion air radially flows straight toward the axis of the burner cylinder 104 through the air inlet holes 104b, the flowing combustion air is apt to concentrate in the diametrical centeral zone of the combustion chamber 104a so that a flame rich with air occurs in the same zone, forming excess air in the diametrical central zone as well as an unburnt gas in a peripheral zone in the burner cylinder 104. However, the excess air is guided together with the flame by the flange member 121 radially outwardly toward the peripheral zone, wherefrom it flows through a gap provided between an outer peripheral surface of the flange member 121 and an inner peripheral surface of the burner cylinder 104 while being mixed with the unburnt gas. On the other hand, when combustion air flows swirlingly into the combustion chamber 104a, the vaporized fuel in the peripheral zone in the burner cylinder 104 is pushed by the swirling combustion air to the diametrical central zone so that a flame rich with fuel occurs in the diametrical central zone, forming an unburnt gas in the diametrical central zone as well as excess air in the peripheral zone in the burner cylinder 104. However, the unburnt gas is guided together with the flame by the flange member 121 radially outwardly toward the peripheral zone, wherefrom it flows through the gap between the outer peripheral surface of the flange member 121 and the inner peripheral surface of the burner cylinder 104 while being mixed with the excess air.

The flange member 121 also serves to transfer heat to the wick 106 by conduction through the shaft 122, as well as to the opposed end face of the wick 106 by radiation, thereby enhancing the degree of fuel vaporization by the wick 106.

However, the proposed combustion heater had the disadvantage that the wick 106 has a limited effective surface area from which liquid fuel is vaporized because the shaft 122 extends through the wick 106, thereby resulting in reduced combustion efficiency.

Further, the wick 106 is held between the wick holder 107 and the burner cylinder 104 with a peripheral edge thereof abutting against an opposed open end edge of the burner cylinder 106 having a small surface area. Therefore, it is difficult to stably hold the wick 106 in place.

Another disadvantage with the proposed combustion heater is that the flange member 121 requires time-consuming machining to manufacture, causing an increased manufacturing cost.

SUMMARY OF THE INVENTION

It is an object of the invention to provide a combustion heater which has an enhanced degree of fuel vaporization by the wick.

It is a further object of the invention to assure positive holding of the wick in place.

It is another object of the invention to facilitate the manufacture of the combustion heater and hence reduce the manufacturing cost.

To attain the above objects, the present invention provides a combustion heater including a burner cylinder defining therein a combustion chamber, the burner cylinder having a peripheral wall thereof having a number of air inlet holes formed therein, one bottomed end thereof having an end wall formed with at least one opening, and another open end thereof having a peripheral edge, a wick exposed to the combustion chamber for being impregnated with liquid fuel, the peripheral edge of the open end of the burner cylinder being disposed in close contact with the wick, the end wall of the bottomed end being opposed to the wick, and a wick holding the wick in place.

The combustion heater according to the present invention is characterized by the improvement wherein the burhner cylinder has a radially extending reflecting portion formed by the end wall of the bottomed end thereof.

Preferably, the reflecting portion is formed at a location radially inward of the at least one opening.

More preferably, the peripheral edge of the open end is radially inwardly curved. The above and other objects, features, and advantages of the invention will be more apparent from the ensuing detailed description taken in conjunction with the accompanying drawings.

BRIEF DESCRIPTION OF THE DRAWINGS

FIG. 5 (b) is a similar view to FIG. 5 (a), showing how combustion air flows swirlingly into the burner cylinder.

DETAILED DESCRIPTION

The invention will now be described in detail with reference to the drawings showing embodiments thereof.

Figure 1:
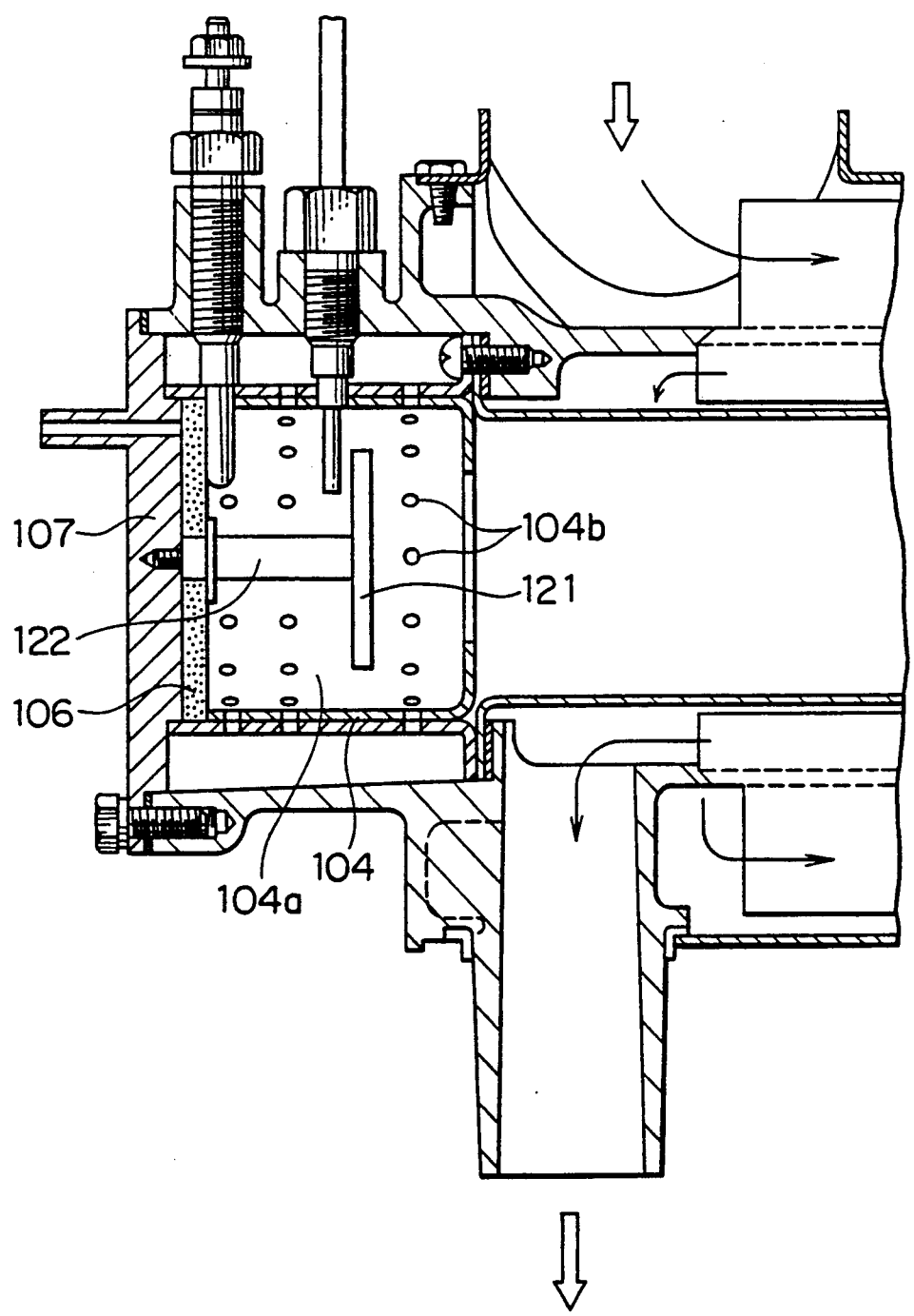
FIG. 1 is a fragmentary longitudinal sectional view of a conventional combustion heater, showing essential parts thereof.
Figure 2:
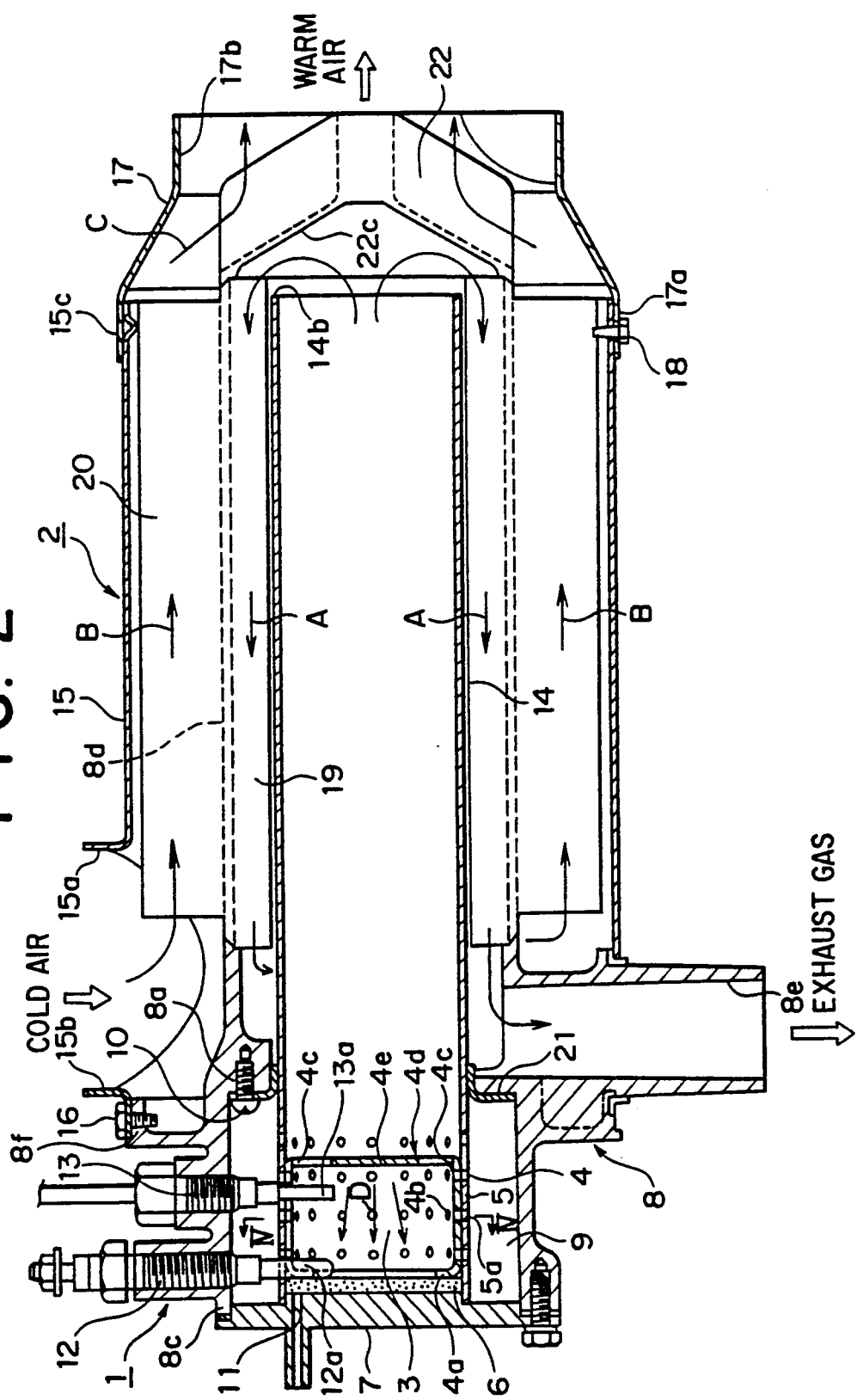
FIG. 2 is a longitudinal cross-sectional view of a combustion heater according to an embodiment of the invention.

FIG. 2 shows a combustion heater according to an embodiment of the invention, which is adapted to heat a space within a hot storage installed on a vehicle or the like. The combustion heater is essentially composed to a burner 1, and a heat exchanger 2.

The burner 1 comprises a burner cylinder 4 defining therein a combustion chamber 3, a heat insulating covering 5 fitted over an outer peripheral surface of the burner cylinder 4, a wick 6 in the form of a disk formed of ceramic fiber and exposed to the combustion chamber 3, a wick holder 7 holding the wick 6 in place, and a burner casing 8.

Figure 3:
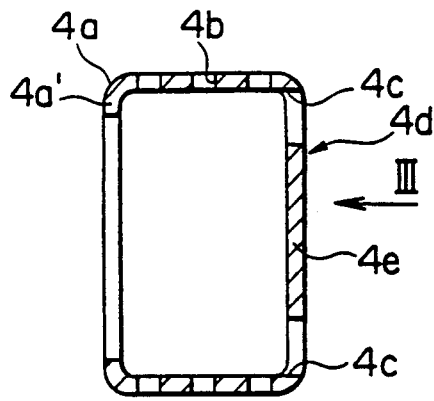
FIG. 3 is a longitudinal cross-sectional view of a burner cylinder in FIG. 2.
Figure 4:
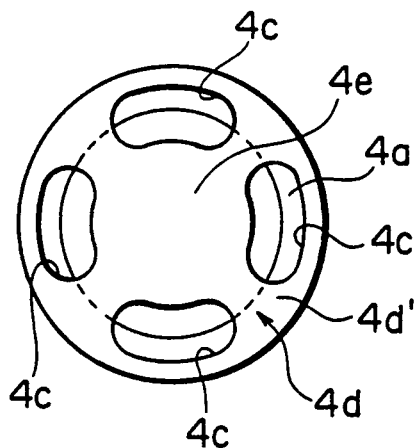
FIG. 4 is an end view of the burner cylinder as viewed from the arrow III in FIG. 3.

As shown in FIGS. 3 and 4, the burner cylinder 4 is generally in the form of a bottomed cylinder, and formed, e.g. of stainless steel, which has an open end 4a with a peripheral edge 4a' thereof radially inwardly curved and an opposite or bottomed end 4d having an end wall 4d' formed with four openings 4c circumferentially arranged at equal intervals, through which a combustion gas generated in the burner cylinder 4 is discharged into the interior of a combustion tube 14, hereinafter referred to. A radially extending reflecting wall portion 4e is formed by a diametrical central portion of the end wall 4d', i.e. at a location radially inward of the openings 4c. The inwardly curved open end edge 4a' is disposed in close contact with an opposed end face of the wick 6.

The burner cylinder 4 has a peripheral wall thereof formed therein with a number of air inlet holes 4b, whereas the heat insulating covering 5 also has a peripheral wall thereof formed therein with a number of air inlet holes 5a at locations corresponding respectively to the air inlet holes 4b of the burner cylinder 4. An air passage 9 is defined between an outer peripheral surface of the heat insulating covering 5 and an inner peripheral surface of the burner casing 8. Combustion air supplied by a blower, not shown, travels in the air passage 9, and then through the air inlet holes 4b, 5a into the combustion chamber 3.

The wick holder 7 is formed therein with a fuel supply passage 11 having one end thereof connected to a fuel supply pipe, not shown, extending from a fuel pump, not shown, and the other end thereof opening in an opposed end face of the wick 6, whereby liquid fuel is supplied from the fuel pump to the wick 6.

A glow plug 12 is removably fitted through a peripheral wall 8c of the burner casing 8 with its ignition tip 12a projected into the combustion chamber 3. Similarly, an ignition sensor 13 is also removably fitted through the peripheral wall 8c with its flame sensing tip 13a projected into the combustion chamber 3.

In the heat exchanger 2, the combustion tube 14 is disposed such that combustion gas with a flame having a high temperature generated in the combustion chamber 3 is introduced into the interior thereof through the openings 4c of the burner cylinder 4. The combustion tube 14 is formed integrally with the heat insulating covering 5, and fixed by bolts 10 to mounting protuberances 8a formed on an inner peripheral surface of the burner casing 8 through a mounting member 21 secured to an outer peripheral surface of the burner cylinder 14.

An inner cylinder 8d is disposed around the combustion tube 14, which extends integrally from the burner casing 8 to a location somewhat axially outward of the other end 14b of the combustion tube 14 to define therebetween a combustion gas passage A. Further, an exhaust port 8e is formed in a lower portion of the burner casing 8 close to the heat exchanger 2, through which combustion gas having passed the combustion gas passage A is discharged to the outside. Combustion gas introduced into the combustion tube 14 travels through the other open end 14b and the combustion gas passage A, and exits from the exhaust port 8e to the outside.

A heat exchanger casing or outer cylinder 15 is disposed around the inner cylinder 8d to define a heating air passage B therebetween. The heat exchanger casing 15 has one end 15b thereof fixed to mounting portions 8f of the burner casing 8 by bolts 16 and the other end 15c thereof having an outer peripheral surface to which an end portion 17a of a duct 17 is secured by bolts 18. The heat exchanger casing 15 has a heating air inlet port 15a formed in an upper end portion thereof close to the burner 1, through which heating air (cold air) from a hot storage, not shown, is supplied into the heating air passage B of the heat exchanger 2.

The inner cylinder 8d has one end thereof remote from the burner 1, which is closed by a closing member 22 having a combustion gas-guide surface 22c, so that the duct 17 cooperates with the closing member 22 to form a passage C communicating with the heating air passage B, and an outlet 17b through which heating air (warm air), which has been heated while passing through the heating air passage B, is discharged. The combustion gas-guide surface 22c also serves to deflect combustion gas glowing through the outer end 14b of the combustion tube 14 into the combustion gas passage A.

A plurality of fins 19 are formed on an inner peripheral surface of the inner cylinder 8d in a manner axially extending and arranged at circumferentially equal intervals so that the heat of combustion gas travelling in the combustion gas passage A can be efficiently transferred to the inner cylinder 8d. On the other hand, a plurality of fins 20 are formed on an outer peripheral surface of the inner cylinder 8d in a manner axially extending and arranged at circumferentially equal intervals so that heating air introduced from the heating air inlet hole 15a is efficiently heated by the heat of the inner cylinder 8d while travelling in the heating air passage B.

The operation of the combustion heater constructed as above will be explained hereinbelow:

When an operating switch, not shown, is turned on to start heating of the space within the hot storage, combustion air is first supplied by the blower, not shown, into the combustion chamber 3 through the air passage 9 and the air inlet holes 5b, 4b of the heat insulating covering 5 and the burner cylinder 4. On the other hand, liquid fuel is supplied from the fuel pump through the fuel passage 11 to the wick 6, to permeate same.

Then, the glow plug 12 is energized to heat the igniter 12a, which vaporizes liquid fuel in the wick 6 and lights up the resulting mixture of vaporized fuel and combustion air to generate a flame within the combustion chamber 3.

As a result, the reflecting portion 4e is heated by the flame to a high temperature, so that the heat of the reflecting portion 4e is transferred by thermal radiation to the opposed end face of the wick 6, as shown by the arrows D in FIG. 2, thereby enhancing the degree of fuel vaporization by the wick 6.

Figure 5A:
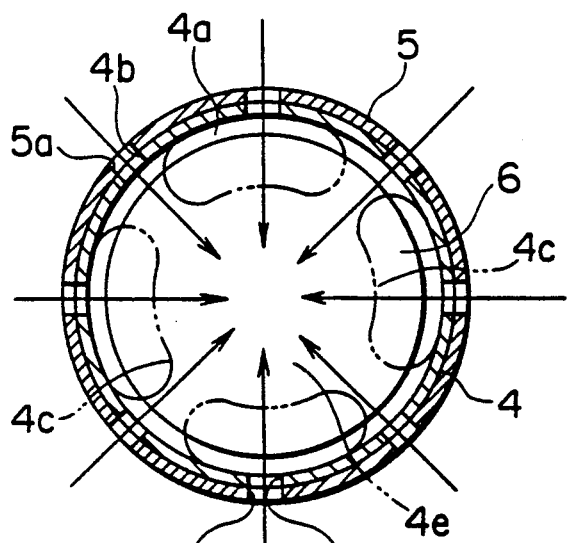
FIG. 5 (a) is a transverse cross-sectional view of the burner cylinder taken along line IV—IV in FIG. 2, showing how combustion air flows straight toward the axis of the burner cylinder.
Figure 5B:
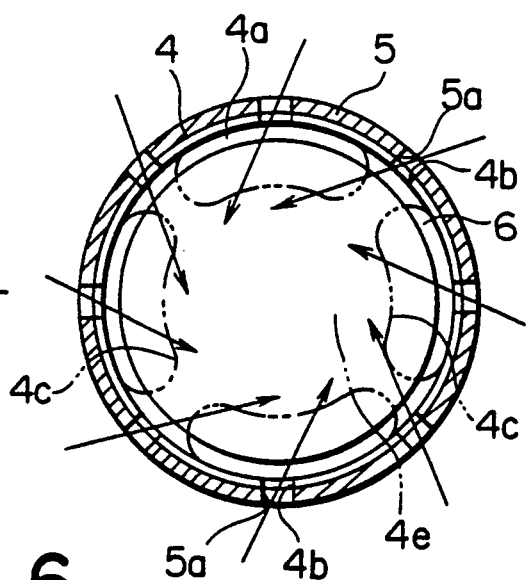

When combustion air flows straight toward the axis of the burner cylinder 4, as shown by the arrows in FIG. 5 (a), the flowing combustion air is apt to concentrate in the diametrical central zone of the burner cylinder 4 so that a flame rich with air occurs in the same zone, whereby part of the air in the zone does not take part in the combustion, forming excess air there. On the other hand, a flame rich with fuel occurs in a peripheral zone in the burner cylinder 4, forming an unburnt gas there. However, the excess air in the diametrically central zone is guided radially outward by the reflecting portion 4e to the peripheral zone in the burner cylinder 4 where it is mixed with the unburnt gas and flows together therewith through the openings 4c while being thoroughly mixed with each other, thereby improving the combustion efficiency within the combustion chamber 3.

On the other hand, when combustion air flows swirlingly into the combustion chamber 3, as shown by the arrows in FIG. 5 (b), the vaporoized fuel in the peripheral zone in the burner cylinder 4 is pushed by the swirling combustion air to the diametrically central zone in the burner cylinder 4 so that a flame rich with fuel occurs in the latter zone, whereby part of the fuel in the zone does not take part in the combustion, forming an unburnt gas there. On the other hand, a flame rich with air occurs in the peripheral zone close to the inner peripheral surface of the burner cylinder 4, forming excess air there. However, the unburnt gas in the diametrically central zone is guided radially outward by the reflecting portion 4e to the peripheral zone where it is mixed with the excess air and flows together therewith through the outlet holes 4c while being thoroughly mixed with each other, thereby improving the combustion efficiency within the combustion chamber 3.

The combustion gas in the combustion chamber 3. is smoothly introduced together with a flame through the outlet holes 4c into the combustion tube 14 of the heat exchanger 2, and then travels through the combustion gas passage A while heating the inner cylinder 8d, and exits through the exhaust port 8e to the outside.

On the other hand, heating air from the hot storage is supplied through the air inlet hole 15a, and travels through the heating air passage B while being heated by the hot inner cylinder 8d. The heating air thus heated passes through the passage C within the duct 17 and is discharged through the heating air outlet 17b into the hot storage, to heat the space within the hot storage.

As described above, according to the invention, the radially inwardly curved opening end edge 4a' of the burner cylinder 4 serves to increase the effective contact area with the opposed end face of the wick 6, thereby positively holding the wick 6 in place in cooperation with the wick holder 7. Further, since the reflecting portion 4e is formed on the end wall 4d' of the burner cylinder 4, instead of providing a flange member secured on one end of a shaft secured to the wick holder 7, there is no necessity of forming a shaft-fitting through hole through the wick 6 along its axis, thereby increasing the effective fuel vaporizing area or degree of fuel dispersion into the combustion chamber 3 and hence the fuel combustion efficiency. Further, no machining is required for forming the reflecting portion 4e of the burner cylinder 4, which greatly simplifies or facilitates the manufacture of the combustion heater with reduced component parts, thereby reducing the total manufacturing cost.

Figure 6:
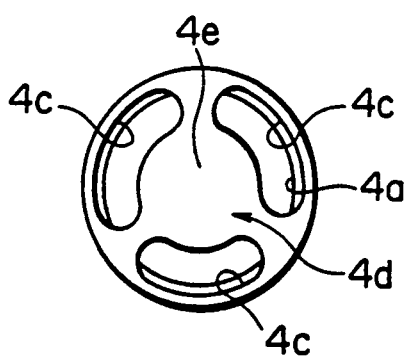
FIG. 6 is a view similar to FIG. 4, showing another embodiment of the invention.

In the above described embodiment, four openings 4c are formed in the bottomed wall 4d of the burner cylinder 4. Alternatively, three openings 4c may be formed, as shown in FIG. 6, providing substantially the same results as in the above described embodiment.

What is claimed is:

1. A combustion heater including a burner cylinder defining therein a combustion chamber, said burner cylinder comprising: p1 a peripheral wall having a number of air inlet holes formed therein;

a bottomed end including an end wall having a plurality of openings therein;

an open end having a peripheral edge;

a wick for being impregnated with liquid fuel; said peripheral edge of said open end of said burner cylinder being disposed in close contact with said wick;

said end wall of said bottomed end being opposed to said wick; and means including a wick holder for holding said wick in place;

said plurality of openings in said end wall of said bottomed end being circumferentially arranged in said end wall of said bottomed end; and said burner cylinder having a reflecting portion formed by a central portion of said end wall of said bottomed end thereof.

2. The combustion heater of claim 1, wherein said reflecting portion is at a location radially inward of said plurality of openings.

3. The combustion heater of claim 1, wherein said plurality of openings comprise four openings circumferentially arranged at substantially equal intervals in said end wall of said bottomed end.

4. The combustion heater of claim 1, wherein said peripheral edge of said open end is radially inwardly curved.

5. The combustion heater of claim 1, further comprising:

a combustion tube; and a heat insulating covering integrally formed with said combustion tube, said heat insulating covering having a number of air inlet holes formed therein at locations corresponding respectively to said air inlet holes in said peripheral wall of said burner cylinder; and wherein said burner cylinder is fitted in said heat insulating covering.

6. The combustion heater of claim 1 wherein said plurality of openings comprise three openings circumferentially arranged at substantially equal intervals in said end wall of said bottomed end.

* * * * *

UNITED STATES PATENT AND TRADEMARK OFFICE
CERTIFICATE OF CORRECTION

PATENT NO. : 5,056,501
DATED : October 15, 1991
INVENTOR(S) : H. IDA

It is certified that error appears in the above-identified patent and that said Letters Patent is hereby corrected as shown below:

Column 6, line 16 (claim 1), delete "p1" and begin new paragraph with "a peripheral wall..."

Signed and Sealed this

First Day of June, 1993

Attest:

MICHAEL K. KIRK

Attesting Officer

Acting Commissioner of Patents and Trademarks